(12) United States Patent
Karneges (10) Patent No.: US 10,841,391 B2
(45) Date of Patent: Nov. 17, 2020

(54) PROXY-MANAGED CHECKPOINT IDENTIFIERS

(71) Applicant: Fanout, Inc., Mountain View, CA (US)

(72) Inventor: Justin Karneges, Vacaville, CA (US)

(73) Assignee: Fanout, Inc., Mountain View ( * ) Notice: Subject to any disclaimer, the term of this patent is extended or adjusted under 35 U.S.C. 154(b) by 472 days.

(21) Appl. No.: 15/623,138

(22) Filed: Jun. 14, 2017

(65) Prior Publication Data
US 2018/0367636 A1 Dec. 20, 2018

(51) Int. Cl.
*H04L 29/08* (2006.01)
*H04L 29/06* (2006.01)
*H04L 12/58* (2006.01)

(52) U.S. Cl.
CPC ...... *H04L 67/2833* (2013.01); *H04L 67/1095* (2013.01); *H04L 67/14* (2013.01); *H04L 67/28* (2013.01); *H04L 51/04* (2013.01); *H04L 67/34* (2013.01); *H04L 67/42* (2013.01)

(58) Field of Classification Search
CPC ..... H04L 67/2833; H04L 67/28; H04L 67/14; H04L 67/1095; H04L 51/04; H04L 67/42; H04L 67/34
See application file for complete search history.

(56) References Cited

U.S. PATENT DOCUMENTS

| | | | | |
|---|---|---|---|---|
| 7,383,307 B2* | 6/2008 | Kirkland | ............... | G06Q 10/10 709/201 |
| 7,702,315 B2* | 4/2010 | Engstrom | ............... | H04L 51/16 455/412.1 |
| 8,489,740 B2* | 7/2013 | Schneider | ............. | H04L 63/123 709/223 |
| 8,549,047 B2* | 10/2013 | Beechuk | ............... | G06Q 50/01 707/803 |
| 8,621,012 B2* | 12/2013 | Jackson | .................. | H04L 51/00 709/206 |
| 9,253,133 B2* | 2/2016 | Dubie | ...................... | H04L 51/16 |
| 9,304,998 B2* | 4/2016 | Diaconu | ............... | G06F 16/128 |
| 9,390,147 B2* | 7/2016 | Bird | ....................... | G06F 16/219 |
| 9,391,787 B2* | 7/2016 | Gillead | ............... | H04L 12/1822 |
| 9,471,436 B2* | 10/2016 | Rash | ................... | G06F 11/1446 |
| 9,628,431 B2* | 4/2017 | Bernstein | ............. | G06Q 10/107 |
| 9,773,052 B2* | 9/2017 | Onusko | ................... | H04L 63/10 |
| 9,934,368 B2* | 4/2018 | Patton | ................. | G06F 21/6245 |
| 10,007,566 B1* | 6/2018 | Sweetland | ............. | G06F 9/546 |
| 10,057,349 B2* | 8/2018 | Kodner | ............... | H04L 67/1097 |
| 10,127,120 B2* | 11/2018 | Park | ....................... | G06F 16/2433 |
| 10,313,297 B2* | 6/2019 | Bernstein | ............. | G06Q 10/107 |
| 10,397,624 B1* | 8/2019 | Largman | ........... | H04N 21/4516 |
| 2007/0033250 A1* | 2/2007 | Levin | ............... | H04L 29/06027 709/204 |
| 2012/0072507 A1* | 3/2012 | Chen | ................... | H04L 12/1836 709/206 |
| 2014/0172993 A1* | 6/2014 | Ordogh | .................. | H04L 51/22 709/206 |

(Continued)

*Primary Examiner* — Patrice L Winder (57) ABSTRACT

Information access can include: generating a checkpoint identifier for each of a set of data streams associated with a listening session for a client of an information access system; and merging the checkpoint identifiers associated with the listening session into a unified checkpoint identifier according to a set of checkpoint merge parameters configured for the listening session.

4 Claims, 12 Drawing Sheets

(56) References Cited

U.S. PATENT DOCUMENTS

| | | | |
|---|---|---|---|
| 2015/0032828 A1* | 1/2015 | Ordogh | H04L 51/00 709/206 |
| 2015/0089354 A1* | 3/2015 | Abrahami | G06F 16/958 715/235 |
| 2015/0295873 A1* | 10/2015 | Orr | H04L 51/16 715/752 |
| 2018/0146034 A1* | 5/2018 | Lintner | H04L 67/1034 |

* cited by examiner

Fig. 1

| Stream Name 1 | Checkpoint Identifier 1 | Separator | Stream Name 2 | Checkpoint Identifier 2 | Separator | Stream Name 3 | Checkpoint Identifier 3 | Separator |

PROXY-MANAGED CHECKPOINT IDENTIFIERS

BACKGROUND

An information access system can provide access to a data stream. A data stream can include a series of updates. A server can feed each update of a data stream to a client as each update is published at the server.

Checkpoint identifiers can be used to coordinate what updates have been received by a client with what updates have been published at a server. For example, a server can generate a checkpoint identifier for an update and send the checkpoint identifier to a client with the update. The checkpoint identifier received at the client can then be compared to a most recent checkpoint identifier generated at the server to determine whether the client is up to date.

SUMMARY

In general, in one aspect, the invention relates to an information access system with proxy-managed checkpoint identifiers. The information access system can include: a backend server that generates a checkpoint identifier for each of a set of data streams associated with a listening session for a client of the information access system; and a proxy server for merging the checkpoint identifiers associated with the listening session into a unified checkpoint identifier according to a set of checkpoint merge parameters configured into the proxy server.

In general, in another aspect, the invention relates to a method for information access. The method can include: generating a checkpoint identifier for each of a set of data streams associated with a listening session for a client of an information access system; and merging the checkpoint identifiers associated with the listening session into a unified checkpoint identifier according to a set of checkpoint merge parameters configured for the listening session.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Reference will now be made in detail to the various embodiments of the present disclosure, examples of which are illustrated in the accompanying drawings. Like elements in the various figures are denoted by like reference numerals for consistency. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, have not been described in detail so as not to unnecessarily obscure aspects of the present disclosure.

Figure 1:
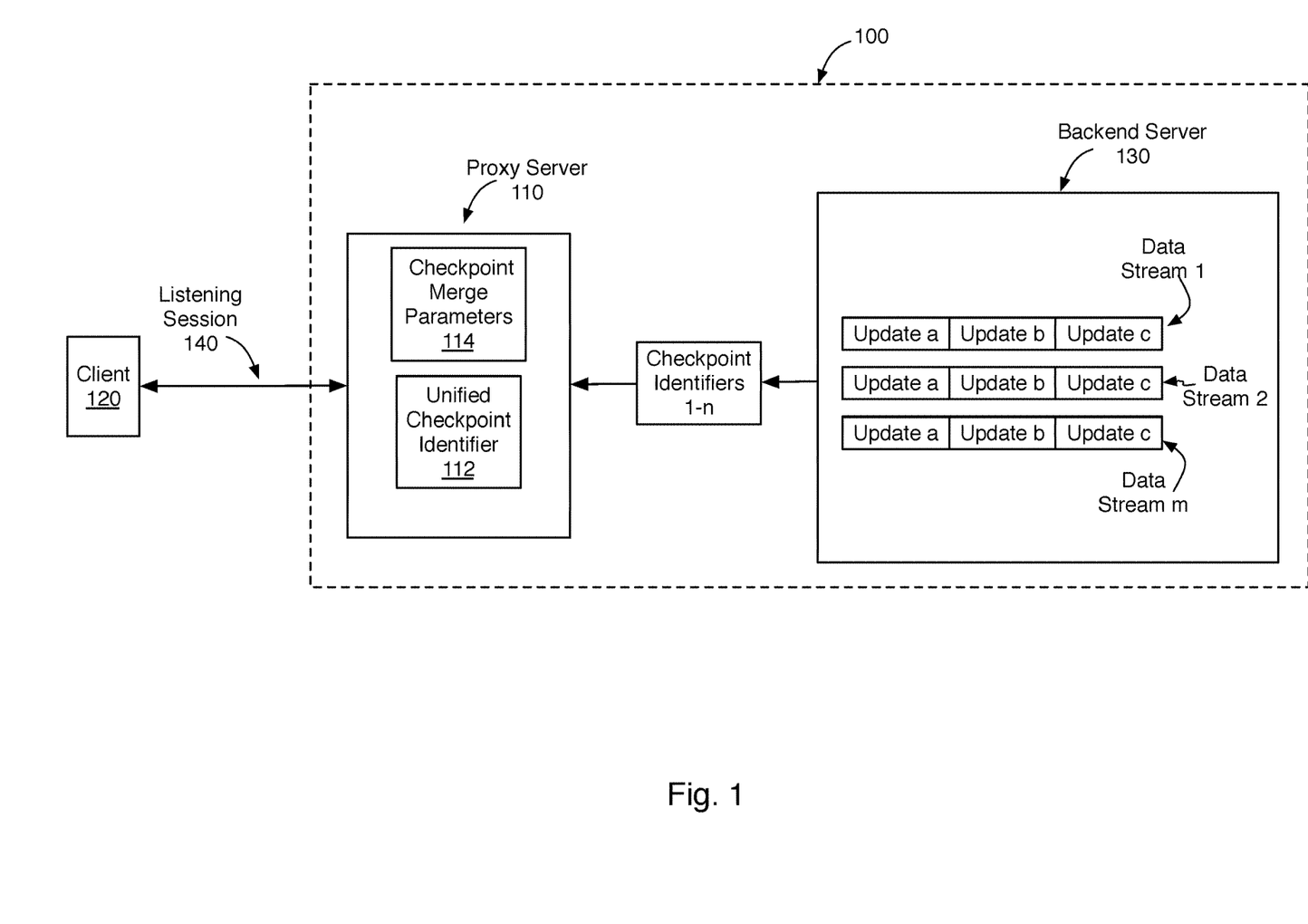
FIG. 1 illustrates an information access system with proxy-managed checkpoint identifiers in one or more embodiments.

FIG. 1 illustrates an information access system 100 with proxy-managed checkpoint identifiers in one or more embodiments. The information access system 100 includes a backend server 130 that enables access to a set of data streams 1-$m$. Each data stream 1-$m$ in this example includes a series of updates a-c.

The data streams 1-$m$ can pertain to any application in the information access system 100. One example of an application is a chatroom application in which each data stream 1-$m$ pertains to a chatroom and each update a-c pertains to a text update of the corresponding chatroom.

The backend server 130 generates a set of checkpoint identifiers 1-$n$ for a subset of the data streams 1-$m$ that are associated with a listening session 140 of a client 120 of the information access system 100. Each checkpoint identifier 1-$n$ uniquely identifies a most recent update of the corresponding data stream 1-$m$.

For example, if the listening session 140 is established for the data streams 1 and 2, the checkpoint identifier 1 indicates which update a-c in the data stream 1 is the most recent and the checkpoint identifier 2 indicates which update a-c in the data stream 2 is the most recent. Likewise, if the listening session 140 is established for the data streams 2 and 7, the checkpoint identifier 1 indicates which update a-c in the data stream 2 is the most recent and the checkpoint identifier 2 indicates which update a-c in the data stream 7 is the most recent.

The information access system 100 includes a proxy server 110 for merging the checkpoint identifiers 1-$n$ associated with the listening session 140 into a unified checkpoint identifier 112 according to a set of checkpoint merge parameters 114. The checkpoint merge parameters 114 inform the proxy server 110 of how to merge the checkpoint identifier 1-$n$ into the unified checkpoint identifier 112.

The checkpoint merge parameters 114 can specify a format for the unified checkpoint identifier 112 including fields, data types, separators, preambles, etc., for carrying the checkpoint identifiers 1-$n$ in the unified checkpoint identifier 112.

In one or more embodiments, the backend server 130 configures the checkpoint merge parameters 114 into the proxy server 110 when the listening session 140 is established. The backend server 130 can use the checkpoint merge parameters 114 to adapt the unified checkpoint identifier 112 to the listening session 140 at runtime, e.g., to communication protocols, server event handling protocols, etc., of the listening session 140.

Figure 2:
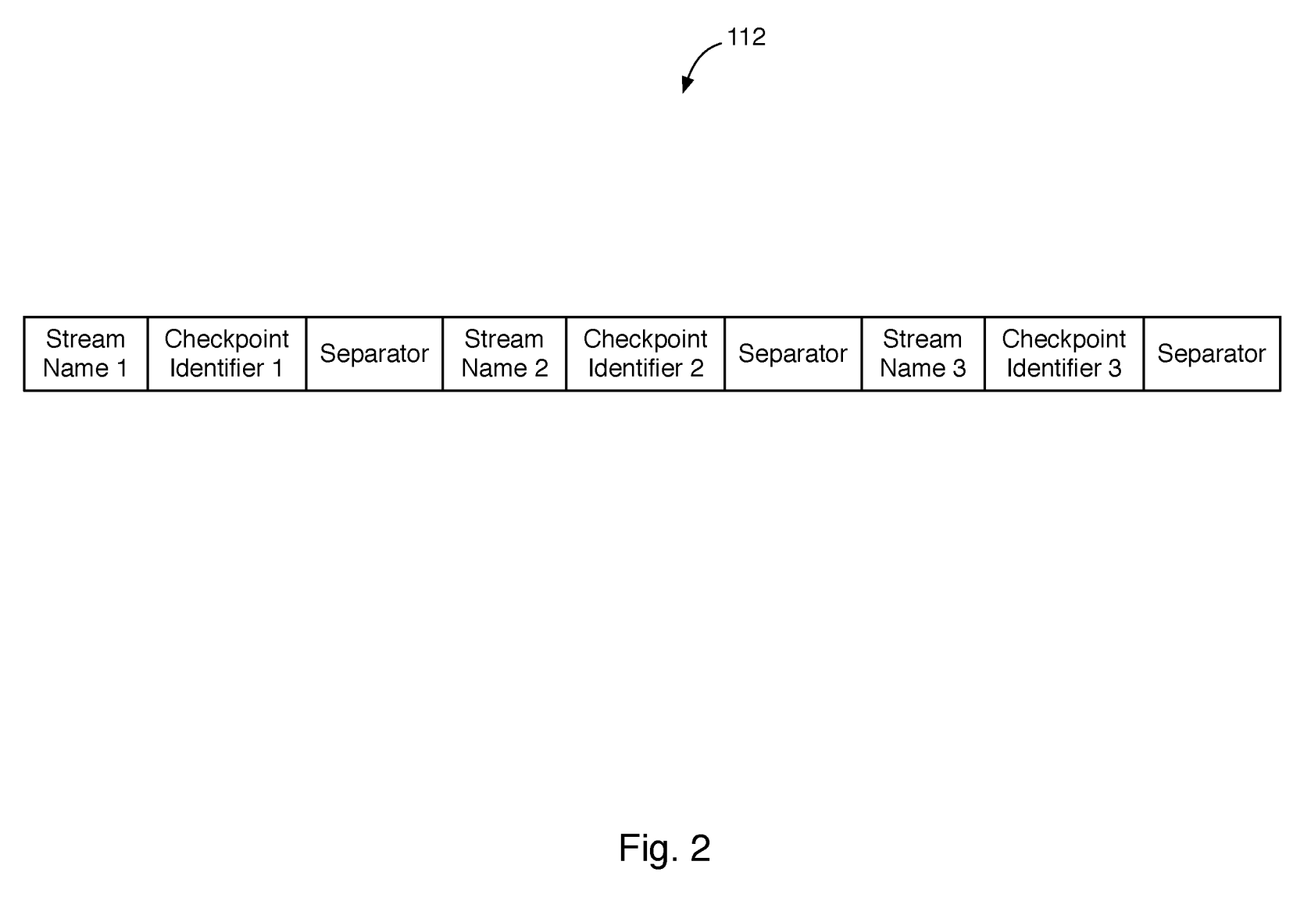
FIG. 2 illustrates an example format for merging a set of checkpoint identifiers into a unified checkpoint identifier.

FIG. 2 shows a format for the unified checkpoint identifier 112 that can be specified by the checkpoint merge parameters 114. In this example, the listening session 140 includes 3 of the m data streams 1-$m$.

The format for the unified checkpoint identifier 112, in this example, includes fields for carrying strings representing the checkpoint identifiers 1-3 along with fields for carrying strings representing stream names as preambles for the checkpoint identifiers 1-3. The format, in this example, includes separators for the checkpoint identifiers 1-3. One example of a separator is character, e.g., ",". The checkpoint merge parameters 114 can specify different separators for delineating each checkpoint identifier 1-3.

The checkpoint merge parameters 114 can specify an encoding of the unified checkpoint identifier 112. For example, the checkpoint merge parameters 114 can specify hexadecimal, base64, or advanced encryption Standard (AES) encryption, to name a few examples.

The checkpoint merge parameters 114 can specify a mode in which the unified checkpoint identifier 112 is to be provided to the client 120 in a data packet. The checkpoint merge parameters 114 can specify a mode in which a reference to the unified checkpoint identifier 112 is to be provided to the client 120 in a data packet.

The checkpoint merge parameters 114 can specify a template with a placeholder marker for a data packet for carrying the unified checkpoint identifier 112 or a reference to it to the client 120. The proxy server 110 can inject the unified checkpoint identifier 112 or the reference at the placeholder marker in a data packet from the backend server 130 before relaying the data packet to the client 120.

Figure 3A:
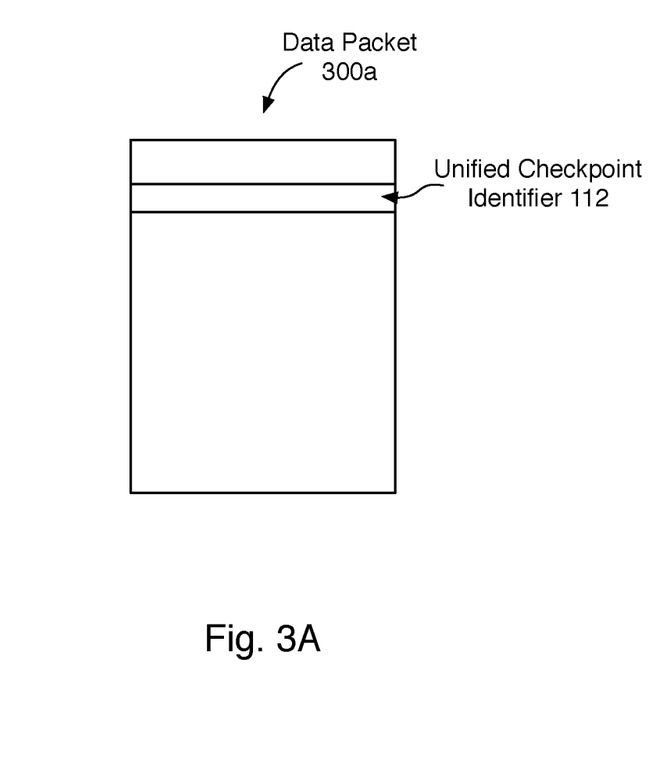
FIG. 3A illustrates how a unified checkpoint identifier can be carried in a data packet to a client of an information access system with proxy-managed checkpoint identifiers.

FIG. 3A illustrates how the proxy server 110 can include the unified checkpoint identifier 112 in a data packet 300$a$ bound for the client 120 in one or more embodiments. The client 120 can extract the unified checkpoint identifier 112 from the data packet 300$a$ and use it as indications of the most recent updates to the data streams 1-$m$ for its listening session 140.

Figure 3B:
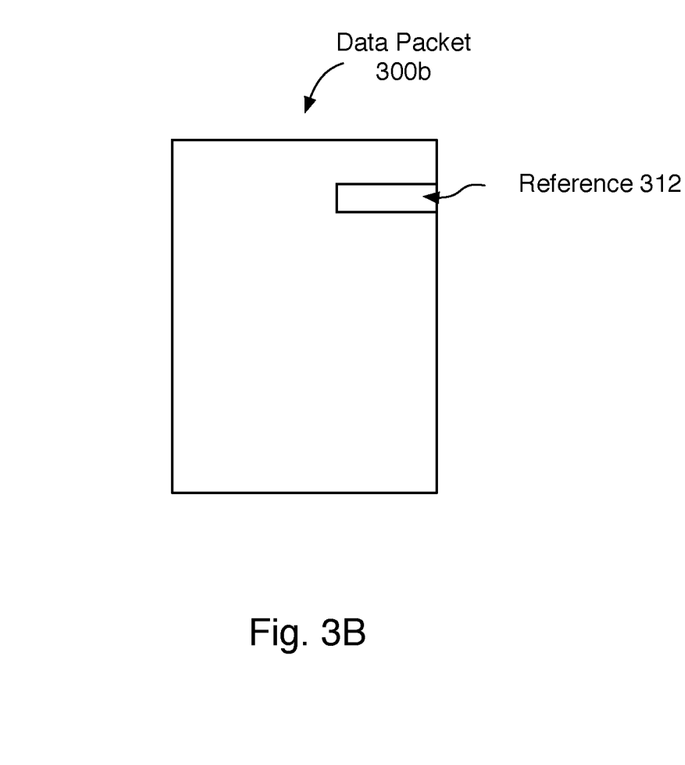
FIG. 3B illustrates how a reference to a unified checkpoint identifier can be carried in a data packet to a client of an information access system with proxy-managed checkpoint identifiers.

FIG. 3B illustrates how the proxy server 110 can include a reference 312 to the unified checkpoint identifier 112, rather than the unified checkpoint identifier 112 itself, in a data packet 300$b$ bound for the client 120 in one or more embodiments. The client 120 can extract the reference 312 from the data packet 300$b$ and use it as indications of the most recent updates to the data streams 1-$m$ for its listening session 140.

Figure 4A:
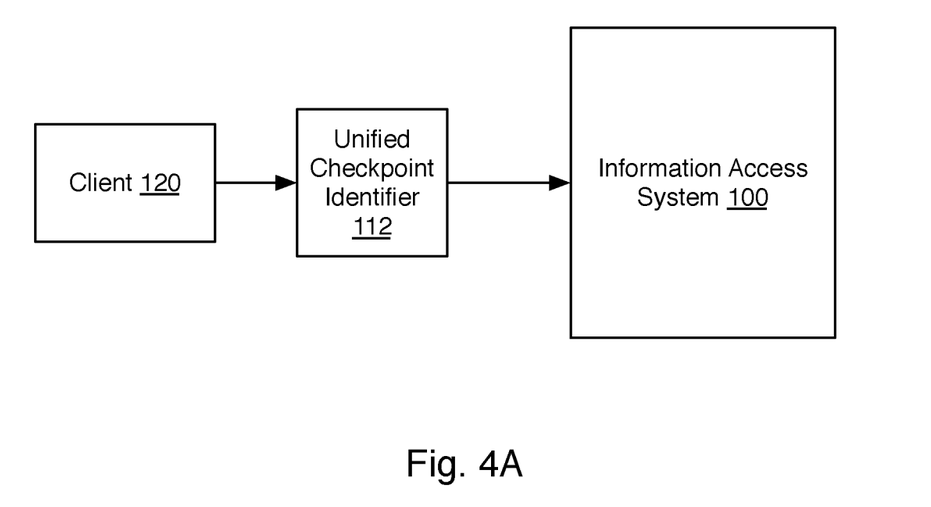
FIGS. 4A-4B illustrate examples of how a client can resume a listening session with an information access system with proxy-managed checkpoint identifiers.

FIG. 4A illustrates how the client 120 can resume the listening session 140 after an interruption in embodiments in which the proxy server 110 provides the unified checkpoint identifier 112 to the client 120. The client 120 can resume the listening session 140 by providing the unified checkpoint identifier 112 back to the information access system 100.

The information access system 100 can then use the unified checkpoint identifier 112 provided by the client 120 to determine whether the client 120 is up to date.

Figure 4B:
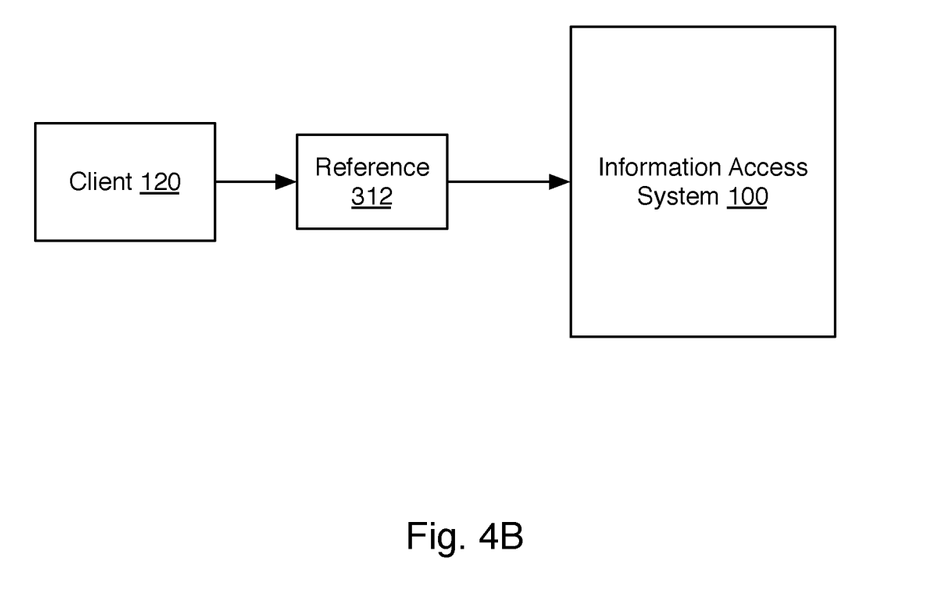

FIG. 4B illustrates how the client 120 can resume the listening session 140 after an interruption in embodiments in which the proxy server 110 provides the reference 312 to the client 120. The client 120 can resume the listening session 140 by providing the reference 312 back to the information access system 100. The information access system 100 can then use the reference 312 to retrieve the unified checkpoint identifier 112 and use it to determine whether the client 120 is up to date.

Figure 5:
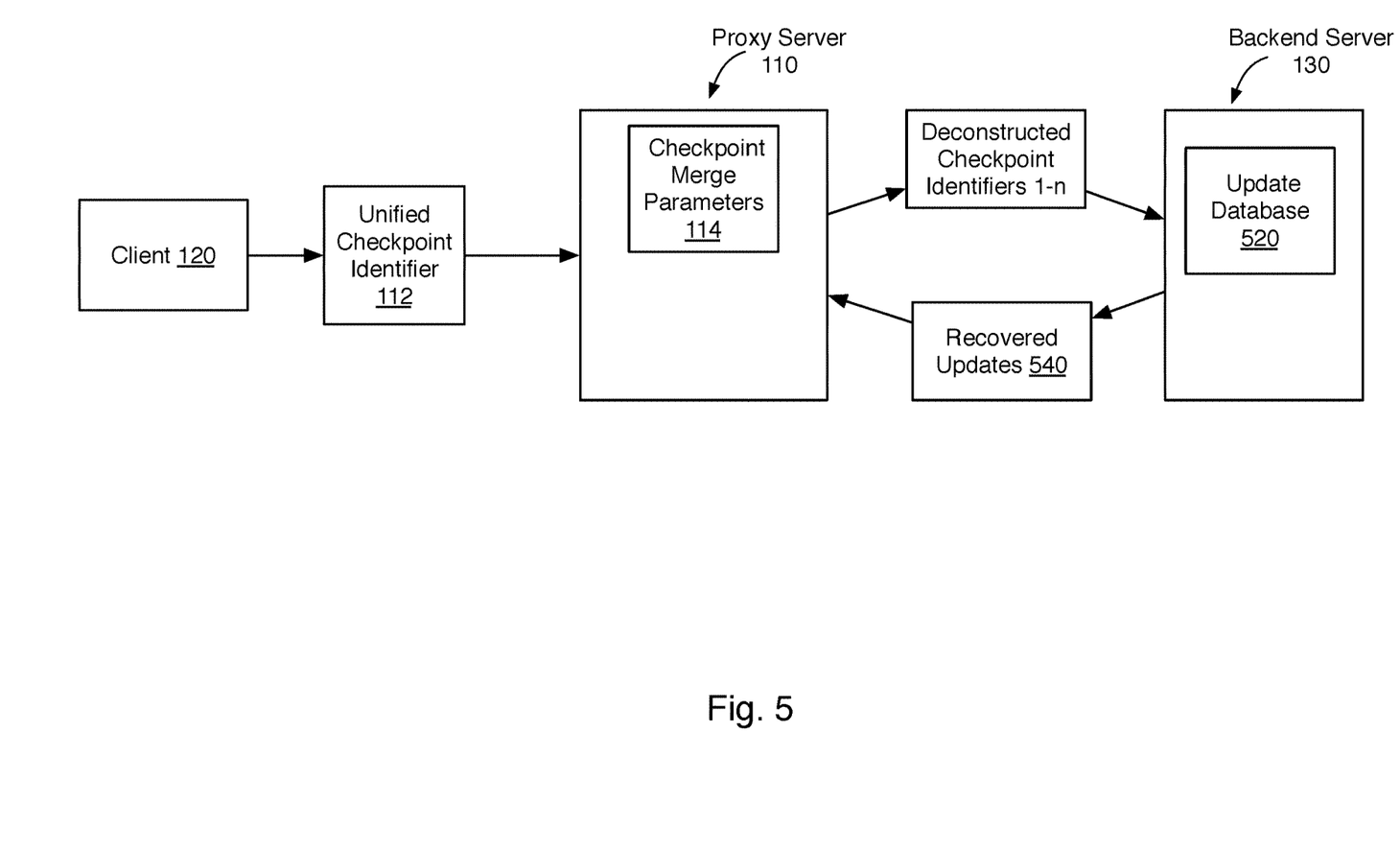
FIGS. 5-6 illustrate examples of how an information access system with proxy-managed checkpoint identifiers can determine whether a client is up to date.

FIG. 5 shows how the information access system 100 can determine whether the client 120 is up to date in response to the checkpoint identifier 112 from the client 120. The proxy server 110 deconstructs the unified checkpoint identifier 112 obtained from the client 120 into a set of deconstructed checkpoint identifiers 1-$n$ using the same checkpoint merge parameters 114 from which the unified checkpoint identifier 112 was originally created. The proxy server 110 provides the deconstructed checkpoint identifiers 1-$n$ to the backend server 130.

The backend server 130 compares the deconstructed checkpoint identifiers 1-$n$ to a current set of checkpoint identifiers 1-$n$ for the listening session 140. Any differences between the deconstructed checkpoint parameters 1-$n$ and the current set of checkpoint parameters 1-$n$ indicates that the client 120 is not up to date.

The backend server 130 can use the deconstructed checkpoint parameters 1-$n$ that are not current to obtain a set of recovered updates 540 from an update database 520. The backend server 130 provides the recovered updates 540 to the proxy server 110. The proxy server 110 can relay the recovered updates 540 to the client 120.

In one or more embodiments, the backend server 130 includes an updated unified checkpoint identifier in the recovered updates 540. The backend server 130 constructs the unified checkpoint identifier in the recovered updates 540 using the same procedures it configured into the checkpoint merge parameters 114 when the listening session 140 was established.

In some embodiments, the proxy server 110 does not deconstruct the unified checkpoint identifier 112 sent by the client 120, but instead passes it on to the backend server 130 which deconstructs it using the same checkpoint merge parameters 114 from which it was created.

Figure 6:
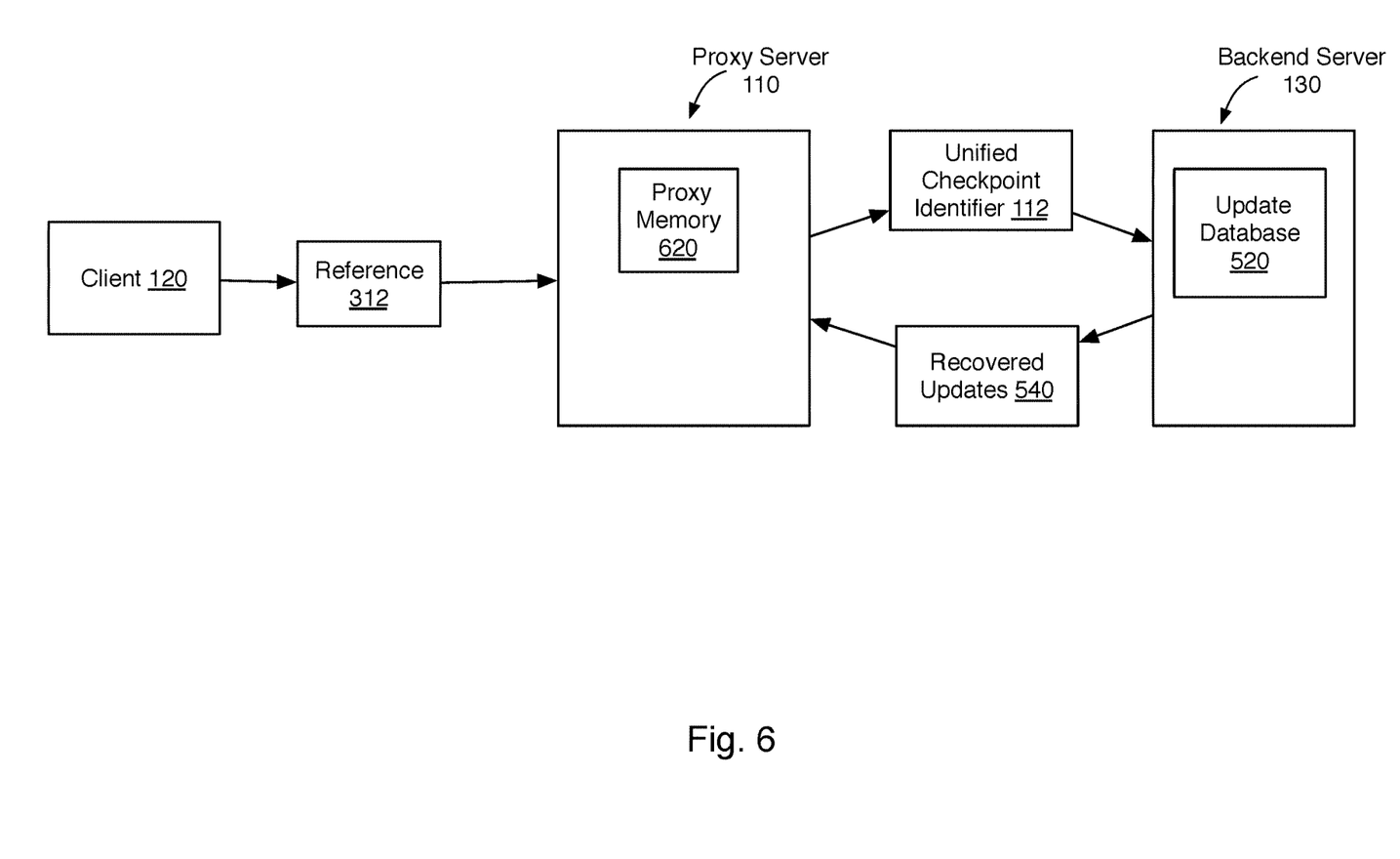

FIG. 6 shows an example of how the information access system 100 can determine whether the client 120 is up to date in response to the reference 312 from the client 120. The proxy server 110 uses the reference 312 obtained from the client 120 to obtain the unified checkpoint identifier 112 from a proxy memory 620, e.g., a local or remote persistent memory, a RAM, disk, networked storage, etc.

In one or more embodiments, the proxy server 110 provides the unified checkpoint identifier 112 obtained from the proxy memory 620 to the backend server 130 and the backend server 130 deconstructs it and uses the checkpoint identifiers 1-$n$ it carries for comparison to the update database 520. In other embodiments, the proxy server 110 deconstructs the unified checkpoint identifier 112 obtained from the proxy memory 620 and sends the checkpoint identifiers 1-$n$ it carries to the backend server 130 for comparison to the update database 520.

Figure 7:
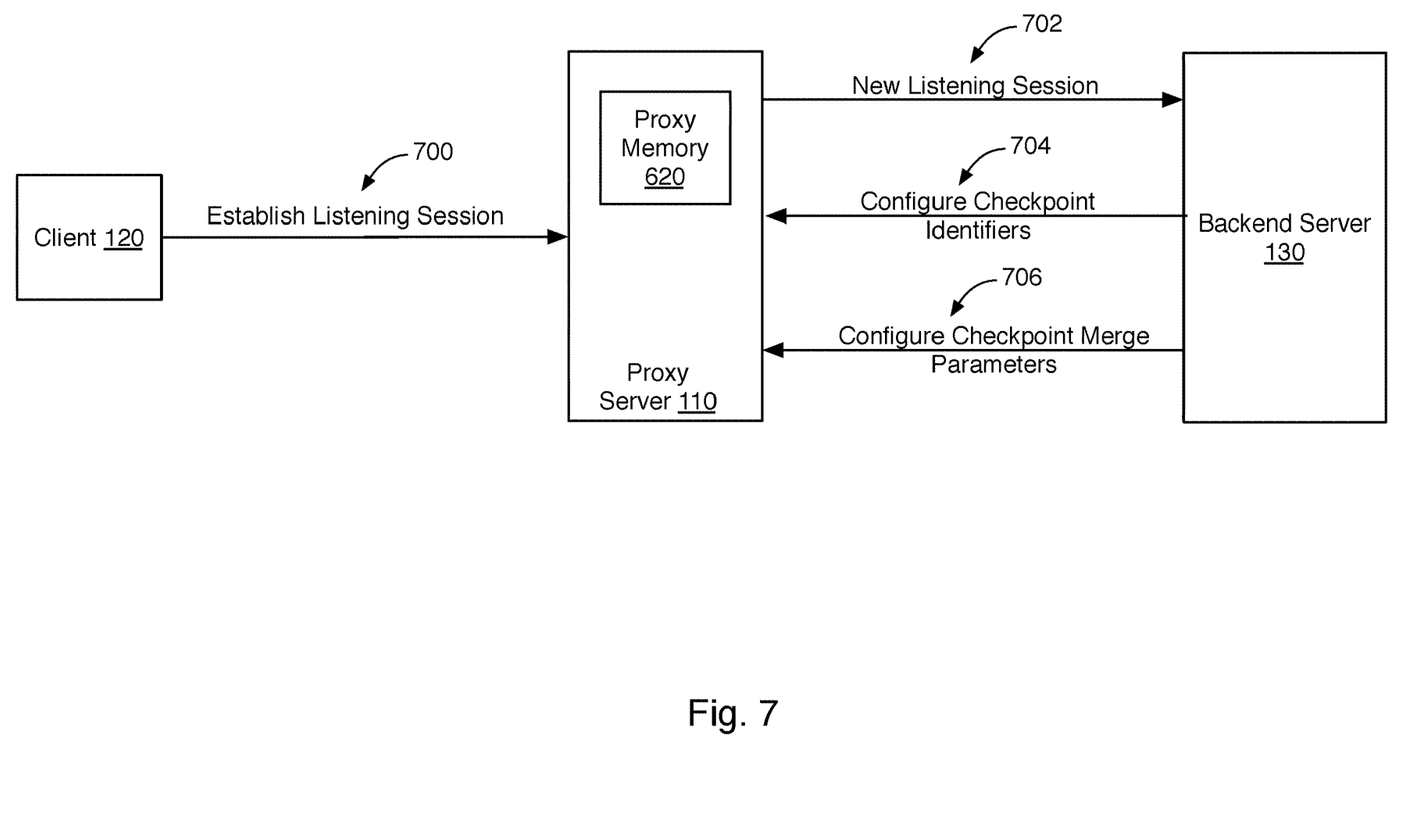
FIGS. 7-9 illustrate a chatroom application of an information access system with proxy-managed checkpoint identifiers.

FIG. 7 shows how the backed server 130 configures the proxy server 110 in an embodiment in which the data streams 1-$m$ are chatrooms in a chatroom application of the information access system 100.

At step 700, the client 120 establishes the listening session 140 with the proxy server 110. The client 120 can be a computing device, e.g., a mobile device, running an app that enables a user to individually select the chatrooms 1-*m*, e.g., via a user interface on a computing device. In this example, the user selects the chatrooms 1 and 2 for the listening session 140.

At step 702, the proxy server 110 informs the backend server 130 of the new listening session 140 for chatrooms 1 and 2. For example, the proxy server 110 can establish respective listening channels for the chatrooms 1 and 2 according to a publish-subscribe protocol provided of the backend server 130.

At step 704, the backend server 130 configures the proxy server 110 with a checkpoint identifier for each data stream 1 and 2 for the new listening session 140. For example, the backend server 130 can configure the proxy server 110 with the checkpoint identifier "checkpoint A" for chatroom 1 and the checkpoint identifier "checkpoint B" for chatroom 2. In one or more embodiments, the proxy server 110 stores the configured checkpoint identifiers in the proxy memory 620.

At step 706, the backend server 110 configures the proxy server 110 with the checkpoint merge parameters 114. The configured checkpoint merge parameters 114 can be stored in the proxy memory 620 along with the configured checkpoint identifiers.

Figure 8:
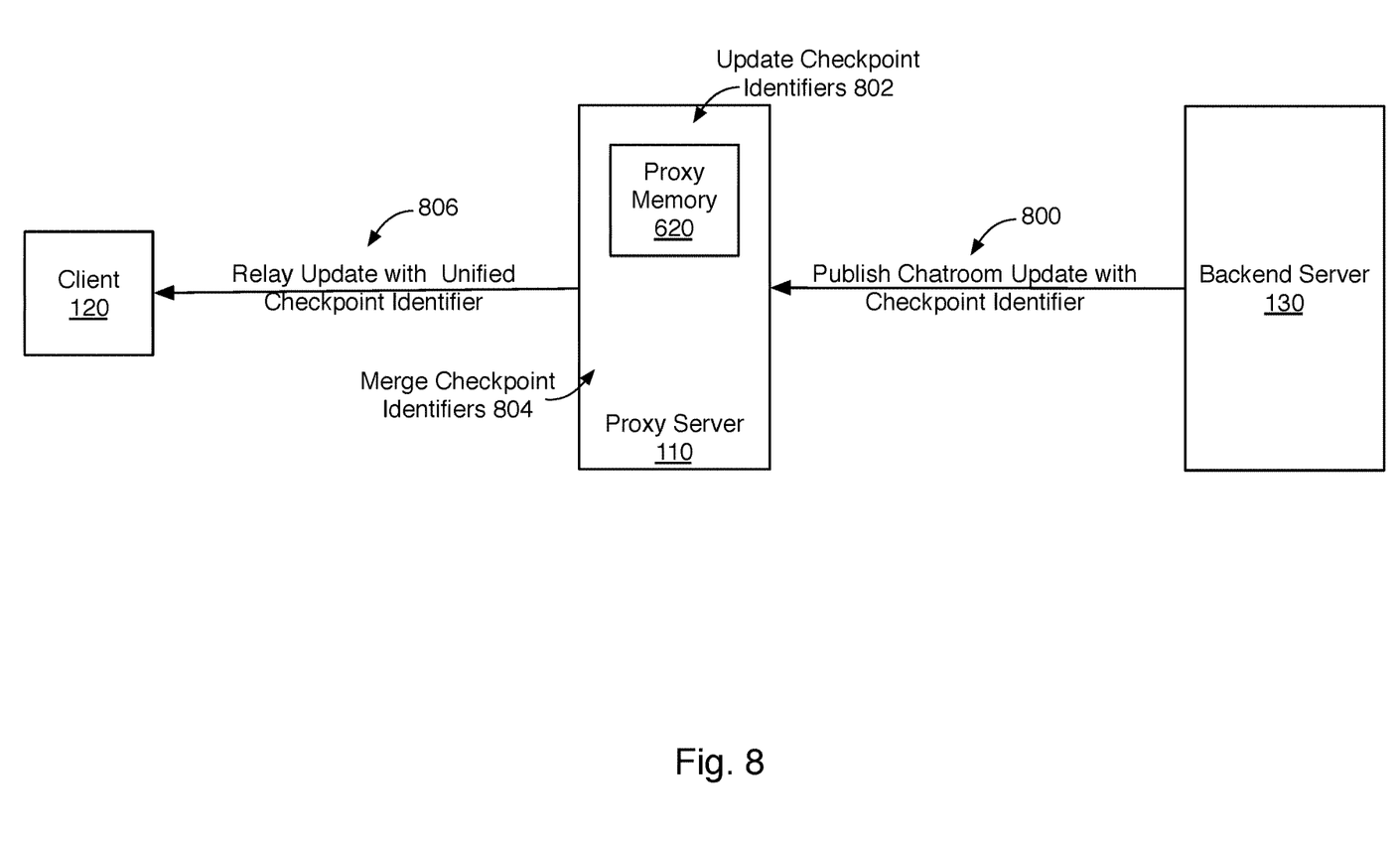

FIG. 8 shows how the information access system 100 handles an update of the chatrooms 1-2 in the listening session 140. At step 800, the backend server 130 publishes a chatroom update along with a checkpoint identifier for the chatroom update. For example, the backend server 130 can publish the chatroom message "Hello" for chatroom 2 along with "checkpoint C" as the updated checkpoint identifier for chatroom 2.

At step 802, the proxy server 110 updates the checkpoint identifier for the chatroom 2 in the proxy memory 620 to "checkpoint C". The proxy memory 620 now holds the checkpoint identifier "checkpoint A" (from step 704) for the chatroom 1 and "checkpoint C" for the chatroom 2.

At step 804, the proxy server 110 merges the checkpoint identifiers for the chatrooms 1 and 2 into a unified checkpoint identifier according to the checkpoint merge parameters 114 held in the proxy memory 620. In this example, the proxy server 110 merges "checkpoint A" for chatroom 1 and "checkpoint C" for chatroom 2, by, e.g., appending prefix strings and concatenating with separators and encoding as specified in the checkpoint merge parameters 114.

At step 806, the proxy server 110 relays the update message "Hello" for chatroom 2 to the client 120 in a data packet along with the unified checkpoint identifier from step 804. Alternatively, at step 806, the proxy server 110 can relay to the client 120 a reference to the proxy memory 620 where the unified checkpoint identifier from step 804 is stored.

Figure 9:
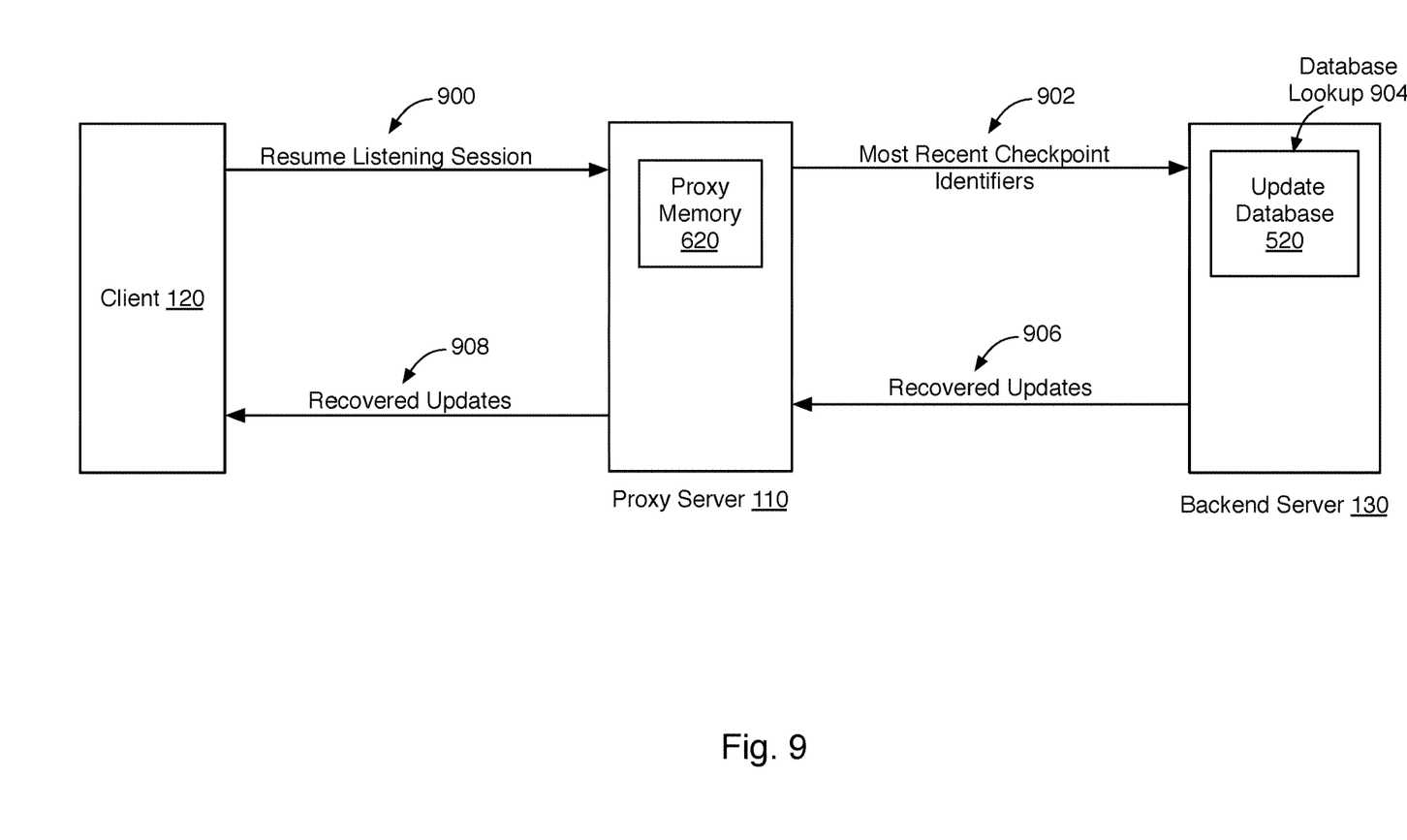

FIG. 9 shows how the information access system 100 recovers a missing update of the chatrooms 1-2. For example, the information access system 100 can recover a missing update of the chatrooms 1-2 after a communication interruption with the client 120.

At step 900, the client 120 resumes the listening session 140 for the chatrooms 1 and 2 by sending the most recent unified checkpoint identifier it received from the proxy server 110 back to the proxy server 110. The most recent unified checkpoint identifier indicates the last updates of the chatrooms 1 and 2 successfully received by the client 120. Alternatively, at step 900, the client 120 can resume the listening session 140 by sending the most recent reference to a unified checkpoint identifier it received from the proxy server 110 back to the proxy server 110.

At step 902, the proxy server 110 deconstructs the most recent unified checkpoint identifier for the client 120, either sent by the client 120 or obtained from the proxy memory 620, and provides the extracted checkpoint identifiers 1 and 2 to the backend server 130. Alternatively, the proxy server 110 can pass the most recent unified checkpoint identifier for the client 120 onto the backend server 130 and the backend server can deconstruct it at step 902.

At step 904, the backend server 130 uses the extracted checkpoint identifiers, e.g., "checkpoint A" for chatroom 1 and "checkpoint C" for chatroom 2, to look up in the update database 520 for any updates for chatrooms 1 and 2 that have occurred after those extracted checkpoint identifiers.

At step 906, the backend server 130 provides any recovered updates for chatrooms 1-2 to the proxy server 110. For example, if a recovered update from the update database 520 is the message "Welcome" with a checkpoint identifier "checkpoint D" for chatroom 2, the backend server 130 creates a unified checkpoint identifier for the recovered update by merging the checkpoint identifier A for chatroom 1 with the checkpoint identifier D for chatroom 2 according to the checkpoint merge parameters 114. The backend server 130 sends the unified checkpoint identifier with the recovered update to the proxy server 110.

At step 908, the proxy server 110 relays the recovered updates and unified checkpoint identifier from step 906 to the client 120. Alternatively, the proxy server 110 can store the unified checkpoint identifier from step 906 in the proxy memory 620 and send a reference to it onto the client 120.

Figure 10:
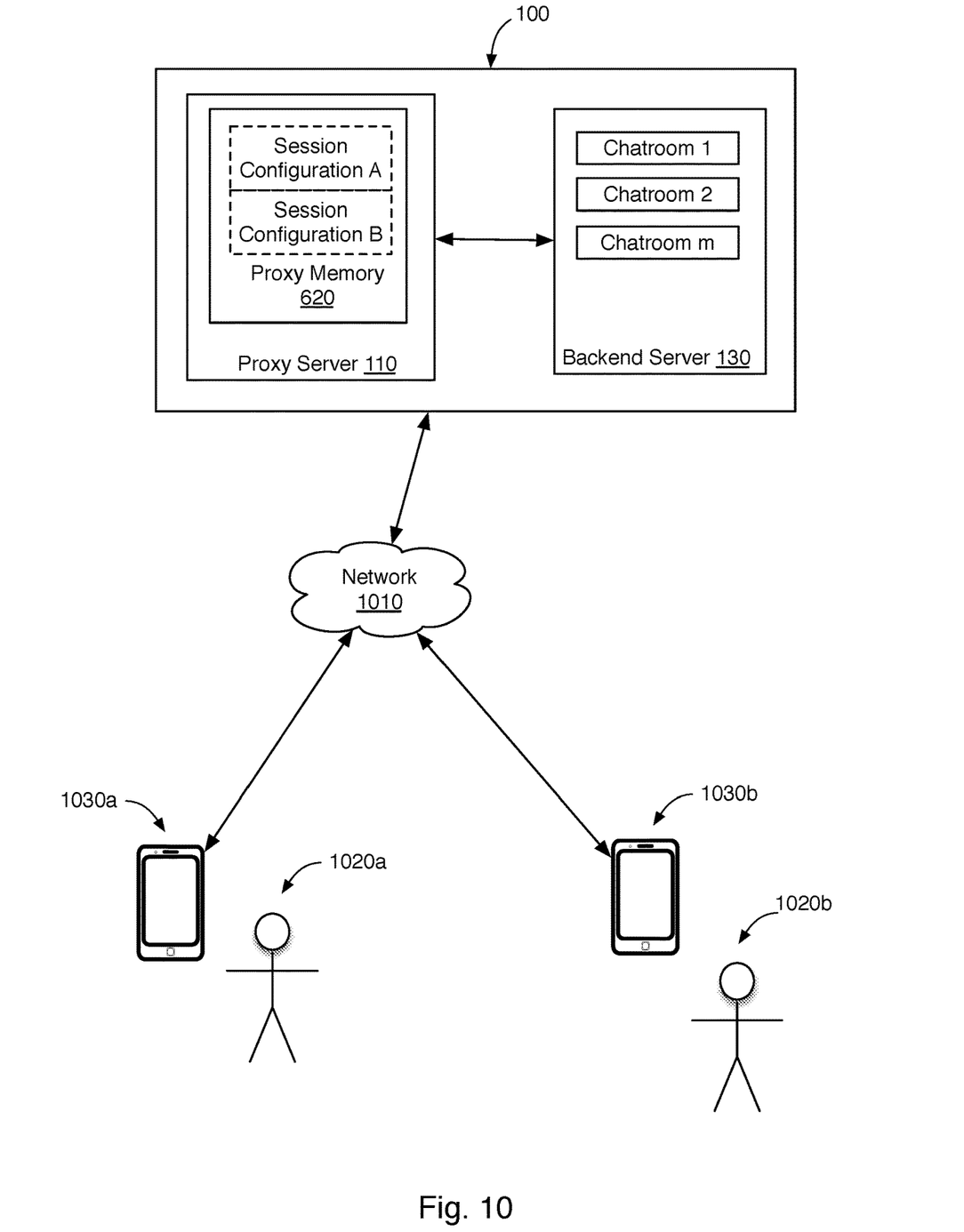
FIG. 10 shows how an information access system with proxy-managed checkpoint identifiers can be configured on a per-user basis.

FIG. 10 shows how multiple users, e.g., a pair of users 1020*a-b*, can access the data streams 1-*m*, e.g., chatrooms 1-*m*, via their respective mobile devices 1030*a-b* via a network 1010. The proxy server 110 maintains a respective session configuration for each user, e.g. a session configuration A for the user 1020*a* and a session configuration B for the user 1020*b*. The session configuration A is adapted to a listening session of the user 1020*a*, and the session configuration B is adapted to a listening session of the user 1020*b*.

For example, the session configuration A includes a set of checkpoint merge parameters adapted to the listening session of the user 1020*a* along with checkpoint identifiers, unified checkpoint identifiers, references to checkpoint identifiers, etc., for the listening session of the user 1020*a*. The proxy server 110 and the backend server 130 construct and deconstruct unified checkpoint identifiers for the user 1020*a* using the checkpoint merge parameters specified in the session configuration A.

Likewise, the session configuration B includes a set of checkpoint merge parameters adapted to the listening session of the user 1020*b* along with checkpoint identifiers, unified checkpoint identifiers, references to checkpoint identifiers, etc., for the user 1020*b*. The proxy server 110 and the backend server 130 construct and deconstruct unified checkpoint identifiers for the user 1020*b* using the checkpoint merge parameters specified in the session configuration B.

Figure 11:
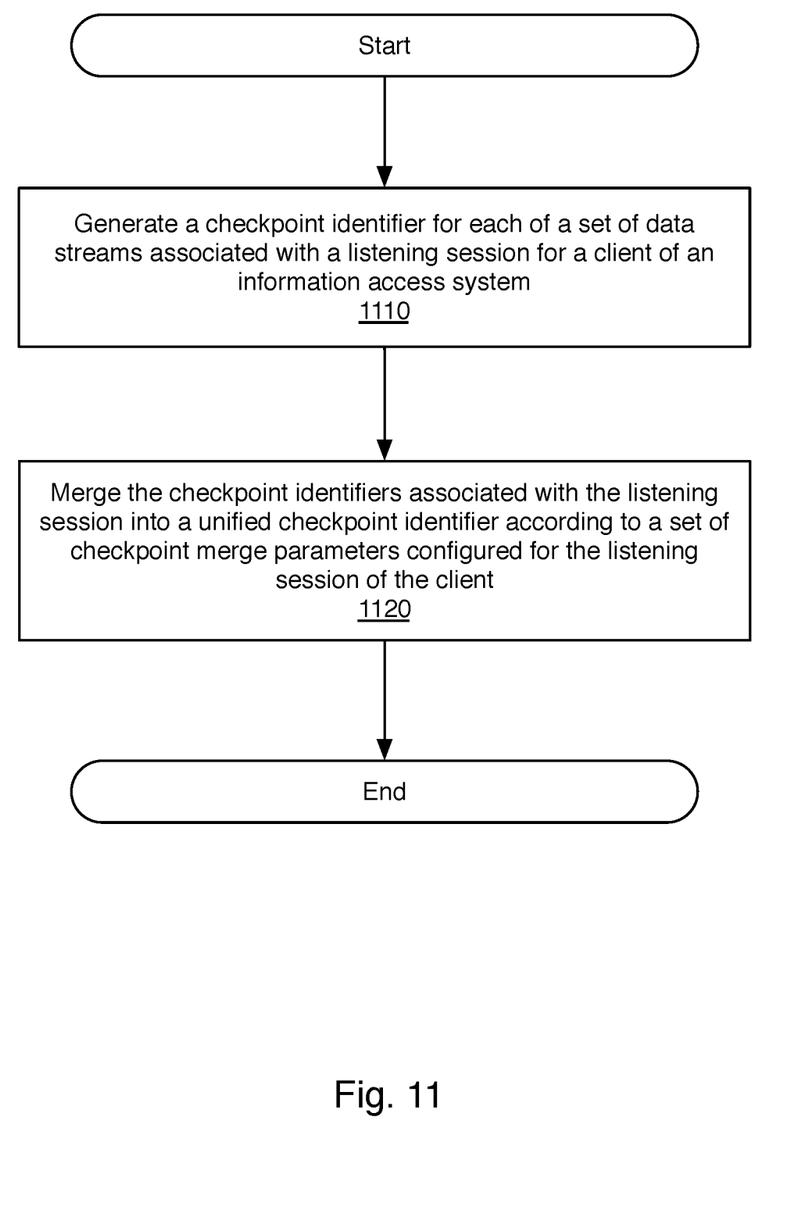
FIG. 11 illustrates a method for information access with proxy-managed checkpoint identifiers in one or more embodiments.

FIG. 11 illustrates a method for information access with proxy-managed checkpoint identifiers in one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 11 should not be construed as limiting the scope of the invention.

At step 1110, a checkpoint identifier is generated for each of a set of data streams associated with a listening session for a client of an information access system. Each checkpoint identifier indicates a most recent update of the corresponding data stream. For example, each checkpoint identifier can be an integer, a string, a timestamp, or other data type that indicates a sequential location of the most recent update in a series of updates.

At step 1120, the checkpoint identifiers associated with the listening session are merged into a unified checkpoint identifier according to a set of checkpoint merge parameters configured for the listening session of the client. The checkpoint merge parameters can be used to adapt the format of the checkpoint identifier to the communication protocol employed in the listening session.

Figure 12:
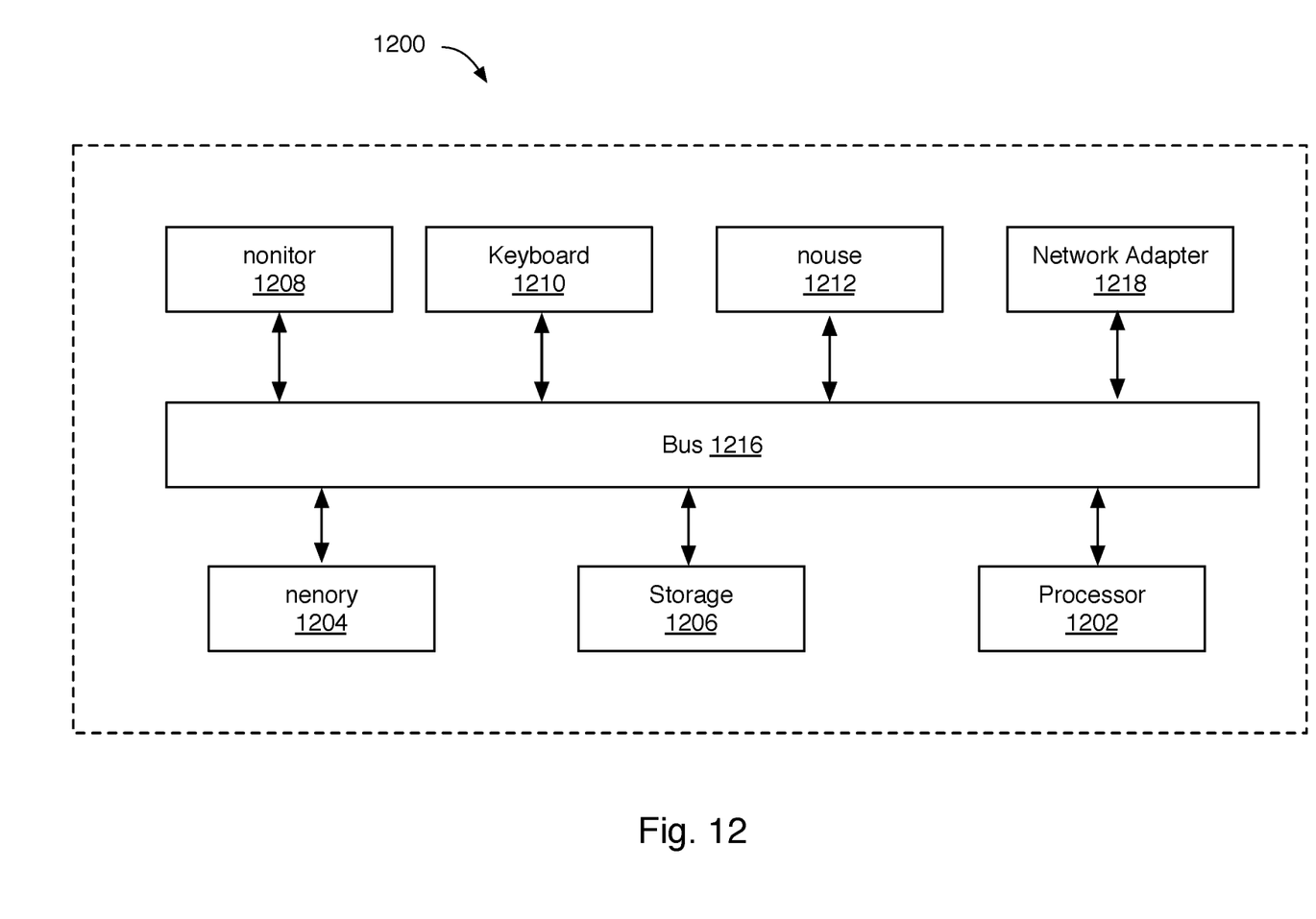
FIG. 12 illustrates a computing system upon which portions of an information access system with proxy-managed checkpoint identifiers can be implemented.

FIG. 12 illustrates a computing system 1200 upon which portions of the information access system 100 can be implemented. The computing system 1200 includes one or more computer processor(s) 1202, associated memory 1204 (e.g., random access memory (RAM), cache memory, flash memory, etc.), one or more storage device(s) 1206 (e.g., a hard disk, an optical drive such as a compact disk (CD) drive or digital versatile disk (DVD) drive, a flash memory stick, etc.), a bus 1216, and numerous other elements and functionalities. The computer processor(s) 1202 may be an integrated circuit for processing instructions. For example, the computer processor(s) may be one or more cores or micro-cores of a processor. The computing system 1200 may also include one or more input device(s), e.g., a touchscreen, keyboard 1210, mouse 1212, microphone, touchpad, electronic pen, or any other type of input device. Further, the computing system 1200 may include one or more monitor device(s) 1208, such as a screen (e.g., a liquid crystal display (LCD), a plasma display, touchscreen, cathode ray tube (CRT) monitor, projector, or other display device), external storage, input for an electric instrument, or any other output device. The computing system 1200 may be connected to, e.g., a local area network (LAN), a wide area network (WAN) such as the Internet, mobile network, or any other type of network) via a network adapter 1218.

While the foregoing disclosure sets forth various embodiments using specific diagrams, flowcharts, and examples, each diagram component, flowchart step, operation, and/or component described and/or illustrated herein may be implemented, individually and/or collectively, using a range of processes and components.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments may be devised which do not depart from the scope of the invention as disclosed herein.

What is claimed is:

1. A method for information access with proxy-managed checkpoint identifiers, comprising:

generating a checkpoint identifier for each of a set of data streams associated with a listening session for a client of an information access system;

merging the checkpoint identifiers associated with the listening session into a unified checkpoint identifier according to a set of checkpoint merge parameters configured for the listening session providing the unified checkpoint identifier to the client; and resuming the listening session by obtaining the unified checkpoint identifier back from the client and deconstructing the checkpoint identifiers from the unified checkpoint identifier obtained from the client and providing the checkpoint identifiers extracted from the unified checkpoint identifier to a backend server.

2. A method for information access with proxy-managed checkpoint identifiers, comprising:

generating a checkpoint identifier for each of a set of data streams associated with a listening session for a client of an information access system;

merging the checkpoint identifiers associated with the listening session into a unified checkpoint identifier according to a set of checkpoint merge parameters configured for the listening session providing the unified checkpoint identifier to the client; and resuming the listening session by obtaining the unified checkpoint identifier back from the client and providing the unified checkpoint identifier obtained from the client to a backend server such that the backend server deconstructs the checkpoint identifiers from the unified checkpoint identifier obtained from the client.

3. A method for information access with proxy-managed checkpoint identifiers, comprising:

generating a checkpoint identifier for each of a set of data streams associated with a listening session for a client of an information access system;

merging the checkpoint identifiers associated with the listening session into a unified checkpoint identifier according to a set of checkpoint merge parameters configured for the listening session providing the client with a reference to a memory of the proxy server where the unified checkpoint identifier is stored; and resuming the listening session by obtaining the reference back from the client and deconstructing the checkpoint identifiers from the unified checkpoint identifier stored in a proxy memory and providing the checkpoint identifiers extracted from the unified checkpoint identifier stored in the proxy memory to a backend server.

4. A method for information access with proxy-managed checkpoint identifiers, comprising:

generating a checkpoint identifier for each of a set of data streams associated with a listening session for a client of an information access system;

merging the checkpoint identifiers associated with the listening session into a unified checkpoint identifier according to a set of checkpoint merge parameters configured for the listening session providing the client with a reference to a memory of the proxy server where the unified checkpoint identifier is stored; and resuming the listening session by obtaining the reference back from the client and providing the unified checkpoint identifier stored in a proxy memory to a backend server such that the backend server deconstructs the checkpoint identifiers from the unified checkpoint identifier.

\* \* \* \* \*